United States Patent
Boban (10) Patent No.: US 11,057,909 B2
(45) Date of Patent: Jul. 6, 2021

(54) RADIO RESOURCE CONTROLLER PRESERVING COMMUNICATION IN AN OUT-OF-COVERAGE AREA

(71) Applicant: Huawei Technologies Co., Ltd., Shenzhen (CN)

(72) Inventor: Mate Boban, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 83 days.

(21) Appl. No.: 16/514,636

(22) Filed: Jul. 17, 2019

(65) Prior Publication Data

US 2019/0364582 A1 Nov. 28, 2019

Related U.S. Application Data

(63) Continuation of application No. PCT/EP2017/050976, filed on Jan. 18, 2017.

(51) Int. Cl.
*H04W 72/12* (2009.01)
*H04W 28/26* (2009.01)
*H04W 48/04* (2009.01)

(52) U.S. Cl.
CPC ....... *H04W 72/1252* (2013.01); *H04W 28/26* (2013.01)

(58) Field of Classification Search
None
See application file for complete search history.

(56) References Cited

U.S. PATENT DOCUMENTS 7,831,252 B2    11/2010    Shang et al.
9,467,938 B1    10/2016    Srinivas et al.
(Continued)

FOREIGN PATENT DOCUMENTS

CN    104080097 A    10/2014
CN    106162894 A    11/2016
(Continued)

OTHER PUBLICATIONS

Naghshineh et al., "Distributed call admission control in mobile/wireless networks," IEEE Journal on Selected Areas in Communications, vol. 14, No. 4, pp. 711-717, Institute of Electrical and Electronics Engineers, New York, New York (May 1996).
(Continued)

*Primary Examiner* — Jay L Vogel
(74) *Attorney, Agent, or Firm* — Leydig, Voit & Mayer, Ltd.

(57) ABSTRACT

A radio resource controller (RRC) is provided for use in a radio cell, in particular a base station, to preserve communication in an out-of-coverage (OOC) area. The RRC includes a processor configured to: determine an egress traffic of mobile communication devices and determine an ingress traffic of mobile communication devices, in particular vehicles, from the OOC area to the area covered by the radio cell. The processor is further configured to determine a demand of radio resources for services running on the mobile communication devices entering the OOC area, and to schedule radio resources for the admitted services based on an admission and scheduling metric with respect to the egress traffic, the ingress traffic, and the demand of radio resources.

16 Claims, 9 Drawing Sheets

(56) References Cited

U.S. PATENT DOCUMENTS

| | | | |
|---|---|---|---|
| 2011/0317780 A1* | 12/2011 | Kang | H04L 5/0053 |
| | | | 375/260 |
| 2014/0295827 A1 | 10/2014 | Tesanovic et al. | |
| 2015/0201392 A1 | 7/2015 | Sartori et al. | |
| 2016/0183237 A1* | 6/2016 | Cai | H04W 72/048 |
| | | | 370/329 |
| 2016/0374105 A1* | 12/2016 | Kalhan | H04W 36/0022 |
| 2017/0135070 A1* | 5/2017 | Huber | H04W 72/048 |
| 2018/0049104 A1* | 2/2018 | Van Phan | H04W 76/14 |
| 2018/0338307 A1* | 11/2018 | Feng | H04L 5/003 |
| 2019/0191442 A1* | 6/2019 | Lu | H04W 72/087 |

FOREIGN PATENT DOCUMENTS

| | | |
|---|---|---|
| EP | 2200227 A1 | 6/2010 |
| WO | 2011109027 A1 | 9/2011 |
| WO | 2015096845 A1 | 7/2015 |
| WO | 2016186995 A1 | 11/2016 |

OTHER PUBLICATIONS

Dertouzos et al., "Multiprocessor online scheduling of hard-real-time tasks," IEEE Transactions on Software Engineering, vol. 15, No. 12, pp. 1497-1506, Institute of Electrical and Electronics Engineers, New York, New York (Dec. 1989).

Vlachos et al., "Bio-Inspired Resource Allocation for Relay-Aided Device-to-Device Communications," IEEE Vehicular Technology Conference, pp. 1-6, Institute of Electrical and Electronics Engineers, New York, New York (Sep. 2016).

Phunchongharn et al., "Resource allocation for device-to-device communications underlaying LTE-advanced networks," IEEE Wireless Communications, vol. 20, No. 4, pp. 91-100, Institute of Electrical and Electronics Engineers, New York, New York (Aug. 2013).

Wu et al., "FlashLinQ: A Synchronous Distributed Scheduler for Peer-to-Peer Ad Hoc Networks," IEEE/ACM Transactions on Networking (TON), vol. 21, No. 4, pp. 1215-1228, Institute of Electrical and Electronics Engineers, New York, New York (Aug. 2013).

Oliveira et al., "An adaptive bandwidth reservation scheme for high-speed multimedia wireless networks," IEEE journal on Selected Areas in Communications, vol. 16, No. 6, pp. 858-874, Institute of Electrical and Electronics Engineers, New York, New York (Aug. 1998).

Yu et al., "Mobility-based predictive call admission control and bandwidth reservation in wireless cellular networks," Computer Networks, vol. 38, No. 5, pp. 577-589, Elsevier, Amsterdam, Netherlands (Apr. 2002).

Choi et al., "Predictive and adaptive bandwidth reservation for hand-offs in QoS-sensitive cellular networks," ACM SIGCOMM Computer Communication Review, vol. 28, No. 4, pp. 155-166, Association for Computing Machinery, New York, New York.

Medina et al., "Interference-Aware Dynamic Resource Allocation for D2D Proximity Services with Beamforming Support," 2015 IEEE Global Communications Conference (GLOBECOM), San Diego, CA, pp. 1-7, Institute of Electrical and Electronics Engineers, New York, New York (Dec. 6-10, 2015).

* cited by examiner

RADIO RESOURCE CONTROLLER PRESERVING COMMUNICATION IN AN OUT-OF-COVERAGE AREA

CROSS-REFERENCE TO RELATED APPLICATIONS

This application is a continuation of International Application No. PCT/EP2017/050976, filed on Jan. 18, 2017. The disclosures of the aforementioned applications are hereby incorporated by reference in their entireties.

TECHNICAL FIELD

The present disclosure relates to a radio resource controller preserving communication in an out-of-coverage (OOC) area and to a mobile communication device receiving a control signal for preserving communication in such an OOC area. In particular, the present disclosure relates to techniques for admission control and resource allocation for delimited out-of-coverage vehicle-to-anything (V2X) communication.

BACKGROUND

Admission control for cellular systems assumes full coverage of radio communication and cannot cope with out-of-coverage situations. Resource allocation for device-to-device (D2D) and cellular systems is performed in-coverage and by assuming sidelink (i.e. D2D or vehicle-to-vehicle (V2V)) communication. In out-of-coverage (OOC) scenarios, reliability cannot be ensured without high control overhead, due to the lack of a central scheduler/controller. Mobility-based resource allocation assumes full coverage and does not work otherwise. Currently, there are no centralized or infrastructure-assisted admission control and resource allocation for (delimited) out-of-coverage (DOC) communication.

SUMMARY

The present application describes technology for an out-of-coverage (OOC) communication in cellular radio systems.

The disclosure presents solutions for providing highly reliable admission control and resource allocation for vehicle-to-vehicle (V2V) communication outside of (cellular) coverage, with a particular focus on out-of-coverage areas delimited on all sides by base stations (e.g., a tunnel or a stretch of a highway). The delimited out-of-coverage (DOC) scenario is particularly interesting because of the following: during early deployment there are coverage gaps, and in a deployed network, either hard-to-solve coverage gaps (e.g., tunnels) or gaps due to economic viability (e.g., insufficient demand on cross-country highway) can occur. Due to the existence of infrastructure surrounding DOC area, there exist performance benefits compared to ad hoc only V2V communication.

Solutions described herein leverage the unique information and control provided by the infrastructure (e.g., base stations and a centralized scheduler) inside the out-of-coverage area surrounded/delimited by that infrastructure. The infrastructure measures i) the ingress/egress traffic and mobility patterns and ii) the demand on data resources by services running on the vehicles, in order to: i) admit or deny admission to the services running on vehicles entering the area; ii) instruct the vehicles entering the out-of-coverage area on how to efficiently use the available resources inside the area; and iii) ensure that any ad hoc (hard to predict) safety services (e.g., crash notification or emergency maneouver) occurring within the area can have the necessary resources and are thus executed with high reliability. The main benefits of the presented solutions are to ensure reliable communication out-of-coverage; and to provide efficiency for reliability, depending on current requirements.

The devices described herein may be implemented in wireless communication networks, in particular communication networks based on mobile communication standards such as long-term evolution (LTE), in particular LTE-advanced (LTE-A) and/or orthogonal frequency division multiplexing (OFDM) and 5G. The devices described herein may further be implemented in base stations (or NodeBs or eNodeBs or radio cells) and in communication devices such as mobile devices (or mobile stations or User Equipments (UEs)), for example in the scenario of machine-to-machine (M2M) communication enabling networked devices to exchange information and perform actions without the manual assistance of humans or in the scenarios of machine-type communication (MTC) or device-to-device (D2D) or vehicle-to-anything (V2X) communication where one mobile device communicates with another mobile device (either by using a communication path traversing the base station or by a communication path non-traversing the base station). Vehicle-to-anything (V2X) communication is the passing of information from a vehicle to any entity that may affect the vehicle, and vice versa. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The devices described herein may be configured to transmit and/or receive radio signals. Radio signals may be or may include radio frequency signals radiated by a radio transmitting device (or radio transmitter or sender) with a radio frequency lying in a range of about 3 kHz to 300 GHz. The frequency range may correspond to frequencies of alternating current electrical signals used to produce and detect radio waves.

The devices described herein may be designed in accordance to mobile communication standards such as, e.g., LTE standard or the LTE-A version thereof. LTE, marketed as 4G and 5G LTE and beyond, is a standard for wireless communication of high-speed data for mobile phones and data terminals. The devices described herein may be applied in OFDM systems where digital data is encoded on multiple carrier frequencies.

The mobile communication devices described in the following may communicate within a communication range referred to as $d_{COM}$. The communication range describes a distance around the mobile communication device within which a communication is possible. Beyond the communication range the mobile communication device is not able to receive and/or transmit radio communication signals. The communication range depends on a given set of transmit and/or receive parameters.

The communication systems described in the following may include multiple base stations or radio cells which cover specific areas around the respective base stations. A size of these so-called covered areas depends on a transceiving power of the respective base stations, in particular on a given set of transmit and/or receive parameters. In between these multiple base stations there may exist areas which are not covered by any of these base stations, in particular not covered by neighboring base stations. These areas are referred to as out-of-coverage (OOC) areas, or more specifically, as delimited out-of-coverage (DOC) areas. Delimited means that these OOC/DOC areas are delimited by covered areas of base stations in which communication to a base station (BS) is available.

In order to describe the invention in detail, the following terms, abbreviations and notations will be used:
OOC: Out-Of-Coverage
DOC: Delimited Out-of-Coverage
RAN: Radio Access Network
MTC: Machine-Type Communication (device)
M2M: Machine-to-Machine (communication)
D2D: Device-to-device
V2X: Vehicle-to-everything
V2V: Vehicle-to-Vehicle
OFDM: Orthogonal Frequency Division Multiplex
BS: Base Station, eNodeB, eNB, radio cell
UE: User Equipment, e.g. a mobile communication device or a machine type communication device
4G: $4^{th}$ generation according to 3GPP standardization
5G: $5^{th}$ generation according to 3GPP standardization
LTE: Long Term Evolution
RF: Radio Frequency
TX: Transmit
RX: Receive
$d_{DOC}$ radius of DOC area
$d_{COM}$ communication range (for a given set of transmit/receive parameters)
N the total capacity of DOC in unit resources
$n_{curr}$ the number of resources taken by the vehicles inside the DOC
$n_a$ the number of resources currently assigned in DOC
R the number of reserved unit resources for ad hoc services in DOC
$\lambda$ the arrival rate of the ad hoc services in DOC
$\gamma$ the density of vehicles in DOC
$\lambda_{AdHoc}$ the rate at which a vehicle generates an ad hoc service in unit distance According to a first aspect, the invention relates to a radio resource controller (RRC) for use in a radio cell, in particular a base station, to preserve communication in an OOC area, the RRC comprising: a processor, configured to: determine an egress traffic of mobile communication devices, in particular vehicles, from an area covered by the radio cell to an OOC area not covered by the radio cell, determine an ingress traffic of mobile communication devices, in particular vehicles, from the OOC area to the area covered by the radio cell, determine a demand of radio resources for services running on the mobile communication devices entering the OOC area, control admission to the services running on the mobile communication devices entering the OOC area, and schedule radio resources for the admitted services based on an admission and scheduling metric with respect to the egress traffic, the ingress traffic and the demand of radio resources.

Such a RRC can schedule resources for the mobile communication devices such that a communication can be preserved when the mobile communication devices traverse an OOC area. Hence, the RRC facilitates out-of-coverage communication in cellular radio systems.

The processor can further determine a mobility pattern of the egress traffic and the ingress traffic and can consider this mobility pattern in the admission and scheduling metric. This can increase reliability of the admission and scheduling.

The RRC can perform one or both of admission control and scheduling. Admission control can be performed either explicitly, e.g. by denying the service to enter OOC/DOC, or implicitly, e.g. by not scheduling resources for it.

In a first possible implementation form of the RRC according to the first aspect, the admission and scheduling metric is based on at least one of the following: a target reliability, in particular a target error probability, vehicle dynamics, in particular position, direction, speed and estimates thereof, transmit powers of the mobile communication devices entering the OOC area, a vehicle density inside the OOC area, before the OOC area and after the OOC area, a likelihood of Ad Hoc services.

This provides the advantage that a lot of data as mentioned above can be exploited by the RRC to provide highly reliable admission and scheduling. The scheduling metric can be used to have a simple relation how to use this information to efficiently provide a reliable admission and scheduling result.

In a second possible implementation form of the RRC according to the first aspect as such or according to the first implementation form of the RRC, the services comprise pre-scheduled services and Ad-hoc services; and the processor is configured to reserve a portion of the schedulable radio resources for the Ad hoc services.

This provides the advantage that there are still some resources available for unforeseen cases, e.g. emergency, etc.

In a third possible implementation form of the RRC according to the first aspect as such or according to any of the preceding implementation forms of the RRC, the processor is configured to admit and/or schedule the radio resources based on feedback from mobile communication devices having traversed the OOC area.

This provides the advantage that using feedback information from mobile communication devices having traversed the OOC area can improve reliability of the admission and scheduling as the latest information about a traffic in the OOC area can be exploited.

In a fourth possible implementation form of the RRC according to the third implementation form of the RRC, the feedback comprises at least one of the following: message error rates, channel state information, vehicle speed information, duration of traversal of the OOC area.

This provides the advantage that this traffic information about the OOC area can be used to improve the admission and/or scheduling.

In a fifth possible implementation form of the RRC according to the first aspect as such or according to any of the preceding implementation forms of the RRC, the OOC area comprises a DOC area, in particular a DOC area surrounded by radio cells, in particular base stations.

The RRC provides highly reliable admission control and resource allocation for V2V communication outside of (cellular) coverage, with a particular focus on out-of-coverage area delimited on all sides by base stations. Due to the existence of infrastructure surrounding DOC areas, there exist performance benefits compared to ad hoc only V2V communication.

In a sixth possible implementation form of the RRC according to the fifth implementation form of the RRC, the processor is configured to admit and/or schedule non-overlapping radio resources, in particular radio resources non-overlapping in time and/or frequency, for the mobile communication devices when a radius of the DOC area is less than a communication range of the mobile communication devices.

This provides the advantage that admitting and/or scheduling non-overlapping resources can be easily performed. The RRC can just assign a different non-overlapping radio resource to each of the mobile communication devices entering the OOC area.

In a seventh possible implementation form of the RRC according to the sixth implementation form of the RRC, the processor is configured to schedule the non-overlapping radio resources for mobile communication devices within the area covered by the radio cell before entering the DOC area.

This provides the advantage that scheduling the non-overlapping radio resources can be performed within the covered area where communication between the base station and the mobile communication devices is available, since the RRC cannot reach them any more once they enter the OOC/DOC area. If the mobile communication devices then enter the DOC area, the RRC has information about the scheduled resources for these mobile communication devices and can schedule other resources to other mobile communication devices.

In an eighth possible implementation form of the RRC according to the fifth implementation form of the RRC, the processor is configured to schedule overlapping radio resources, in particular radio resources overlapping in time and/or frequency, on spatially non-overlapping DOC areas when a radius of the DOC area is above a communication range of the mobile communication devices.

In this implementation form, overlapped resources are scheduled on spatially non-overlapping areas of DOC, e.g. different locations within DOC, so that they don't interfere. This provides the advantage that admission and/or scheduling can be performed for complex traffic situations where the communication range of the mobile communication devices is low or where the DOC area is of large size.

In a ninth possible implementation form of the RRC according to the eighth implementation form of the RRC, the processor is configured to schedule the overlapping radio resources based on reusing radio resources within the DOC area.

This provides the advantage that in complex traffic situations overlapping radio resource can be scheduled on spatially non-overlapping DOC areas to provide an efficient and reliable usage of radio resources for complex traffic situations.

In a tenth possible implementation form of the RRC according to the ninth implementation form of the RRC, the processor is configured to schedule the reusing of radio resources based on at least one of the following: a vehicle speed estimation, a propagation condition estimation, a prediction of vehicle meeting points within the DOC area.

This provides the advantage that the reusing of radio resources can be efficiently scheduled when the above-indexed information are available.

In an eleventh possible implementation form of the RRC according to any of the eighth to the tenth implementation forms of the RRC, the processor is configured to schedule the radio resources for the mobile communication devices based on an estimated interference matrix indicating interference between the mobile communication devices.

This provides the advantage that by using interference between the mobile communication devices the RRC can enable a trade-off between reliability and efficiency of resource usage depending on the current requirements.

In a twelfth possible implementation form of the RRC according to any of the eighth to the eleventh implementation forms of the RRC, the processor is configured to schedule the overlapping radio resources for the mobile communication devices based on a multi-processor scheduling scheme, with our without using feedback according to the third or the fourth implementation form of the RRC, wherein a number of schedulable radio resources corresponds to a number of processors of the multi-processor scheduling scheme, and wherein schedulable services running of the mobile communication devices correspond to schedulable tasks of the multi-processor scheduling scheme.

The systems with multi-processor scheduling scheme benefit greatly from feedback.

This implementation form provides the further advantage that standard solutions for solving this multi-processor scheduling problem are available, e.g. online bin packing solution, online job ship scheduling solution and multi-processor scheduling as described below. The solution corresponds to solving a non-deterministic polynomial-time hard (i.e. an NP-hard) optimization problem.

Note that the multi-processor scheduling scheme can—but doesn't need to—use feedback from third or fourth implementation forms of the RRC. That is, there is a possibility of using feedback according to the third or fourth implementation forms of the RRC.

In a thirteenth possible implementation form of the RRC according to the first aspect as such or according to any of the preceding implementation forms of the RRC, the processor is configured to schedule the radio resources based on a set of pre-assigned radio resources.

This provides the advantage that for some traffic situations a specific radio resource can be pre-assigned to each mobile communication device which facilitates admission and scheduling.

According to a second aspect, the invention relates to a mobile communication device, comprising: a receiver, configured to receive a radio resource control signal from a radio cell, in particular a base station, wherein the radio resource control signal indicates an admission to services running on the mobile communication device and a scheduling of radio resources for the admitted services when the mobile communication device enters an OOC area not covered by the radio cell; and an RRC configured to admit the services and to schedule the radio resources for the admitted services based on the radio resource control signal received from the base station when the mobile communication device enters the OOC area.

Such a mobile communication device can be efficiently scheduled by an RRC such that a communication can be preserved when the mobile communication device traverses an OOC area. Hence, out-of-coverage communication between mobile communication devices in cellular radio systems can be facilitated.

According to a third aspect, the invention relates to a method for ensuring reliable out-of-coverage communication comprising information exchange between base stations surrounding the DOC.

This provides the advantage of ensuring reliable communications in out-of-coverage areas and enabling trading efficiency for reliability depending on current requirements.

In a first possible implementation form of the method according to the third aspect, resource admission is based on one or more of the following: desired reliability, vehicle dynamics: position, direction, speed and their estimates, transmit power, vehicle density inside and before/after DOC, likelihood of ad hoc services (fixed/historical or dynamic).

A second possible implementation form of the method according to the third aspect, resource scheduling is based on one or more of the following: desired reliability, vehicle dynamics: position, direction, speed and their estimates, transmit power, vehicle density inside and before/after DOC, likelihood of ad hoc services (fixed/historical or dynamic).

In a third possible implementation form of the method according to the first implementation form of the third aspect, the method used for resource scheduling is based on multi-processor scheduling.

In a fourth possible implementation form of the method according to the first implementation form of the third aspect, Scheduler training is performed using feedback from vehicles traversing DOC.

In a fifth possible implementation form of the method according to the fourth implementation form of the third aspect, Input used for training comprises one or more of the following: message error rates, channel state information, vehicle speed information (incl. average and distributions), duration of traversal of DOC (individual and average).

In a sixth possible implementation form of the method according to the first implementation form of the third aspect, vehicles get assigned a set of pre-assigned resources between which they can switch, based on channel sensing.

BRIEF DESCRIPTION OF THE DRAWINGS

Further embodiments of the invention will be described with respect to the following figures, in which.

DETAILED DESCRIPTION OF EMBODIMENTS

In the following detailed description, reference is made to the accompanying drawings, which form a part thereof, and in which are shown, by way of illustration, specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
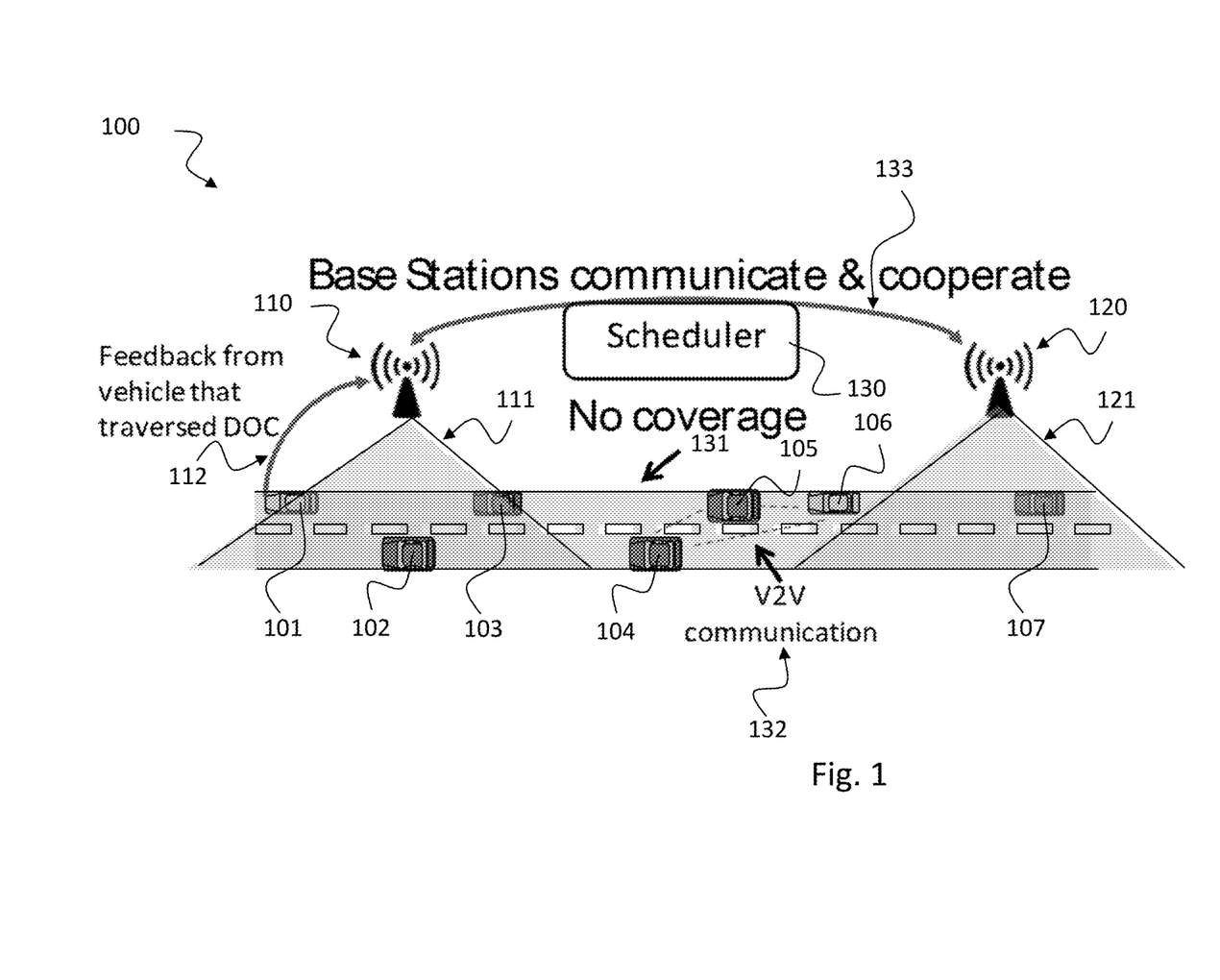
FIG. 1 shows a schematic diagram illustrating a delimited Out of Coverage (DOC) area of a mobile communication system 100 according to an implementation form.

FIG. 1 shows a schematic diagram illustrating a delimited Out of Coverage (DOC) area 131 of a mobile communication system 100 according to an implementation form. A stretch of out-of-coverage 131 highway is surrounded on both sides by infrastructure (base stations 110, 120), which are connected/coordinated and implement a centralized scheduler 130. In the scenario of FIG. 1 a plurality of vehicles or cars are driving on a street or highway. Each vehicle includes a communication device for mobile communication with a base station or with another communication device of another vehicle. In the communication system 100 an exemplary number of two base stations 110, 120 is shown which cover parts of the streets. For example, a first vehicle 101, a second vehicle 102 and a third vehicle 103 are within a radio coverage area 111 of the first base station 110. A fourth vehicle 104, a fifth vehicle 105 and a sixth vehicle 106 are in an out-of-coverage area 131 (also referred to as DOC area) between the two base stations 110, 120 and a seventh vehicle is within the radio coverage area 121 of the second base station 120. All vehicles or cars are driving on the street and are moving from a coverage area to an out-of-coverage area (e.g. from coverage area 121 of second BS 120 to out-of-coverage area 131) or vice versa (e.g. from out-of-coverage area 131 to coverage area 111 of first BS 110). The vehicles 104, 105, 106 that are currently within the DOC area 131 are communicating by using V2V communication 132. The first vehicle 101 that has traversed the DOC area 131 and is going to leave the coverage area 111 of the first BS 110 transmits feedback information 112 to the first BS 110. Both BS 110, 120 communicate and cooperate 133, e.g. by exploiting feedback information 112 of vehicles having traversed the DOC area 131, and use a scheduler 130 for scheduling radio resources of communication devices in the vehicles in order to assist the vehicles that are leaving the coverage areas 111, 121 how to react in the DOC area 131.

The following parameters can be specified in order to describe the communication system 100 depicted in FIG. 1: $d_{DOC}$ is the radius of the DOC area 131; $d_{COM}$ is the communication range (for a given set of transmit/receive parameters); N is the total capacity of DOC 131 in unit resources; $n_{curr}$ is the number of resources (e.g. time/frequency radio resources) taken by the vehicles 104, 105, 106 inside the DOC 131; $n_a$ is the number of resources currently assigned in DOC 131. R is the number of reserved unit resources for ad hoc services in DOC 131; $\lambda$ is the arrival rate of the ad hoc services in DOC 131; $\gamma$ is the density of vehicles 104, 105, 106 in DOC 131; and $\lambda_{AdHoc}$ is the rate at which a vehicle generates an ad hoc service in unit distance.

It is assumed that there exist two types of vehicle-to-vehicle (V2V) services that need to be enabled both in-coverage and out-of-coverage. The first type is a Pre-scheduled, e.g. beaconing (CAMs), platooning, etc. The second type is "Ad hoc" that is safety-critical and cannot be scheduled, but can be initiated within DOC 131 and needs to be provisioned for e.g., emergency break, crash notification, and other DENM services. The BSs 110, 120 surrounding DOC 131 are cooperating 133, i.e., exchange relevant vehicle information and are synchronized. The synchronization granularity is flexible and will affect resource scheduling granularity. A central scheduler 130 or a distributed coordinated scheduler (same) can be used for scheduling the resources. The radius $d_{DOC}$ of the DOC area 131 is known, and also a target reliability, (bounds on) probability of ad hoc services (e.g., historic data for road, general statistics on hazardous events, etc.) are known.

The above described problem, i.e. finding a concept for an out-of-coverage communication in cellular radio systems, can be casted as a call admission/resource allocation scenario. DOC 131 can be considered as a "cell" with specific amount of available resources (capacity). Note that, if a regular cell has N resources per unit area, then an equivalent-sized DOC can also support N concurrent services. At most N-R pre-scheduled services (equivalent to "calls") per unit area can be admitted to DOC 131, where R is the number of Ad hoc services per unit area active in DOC 131. Note that, once admitted, services cannot be revoked (due to no coverage). Then admission and allocation can be adjusted according to a target reliability (e.g., error probability: $10^{-2}$-$10^{-5}$).

Figure 2:
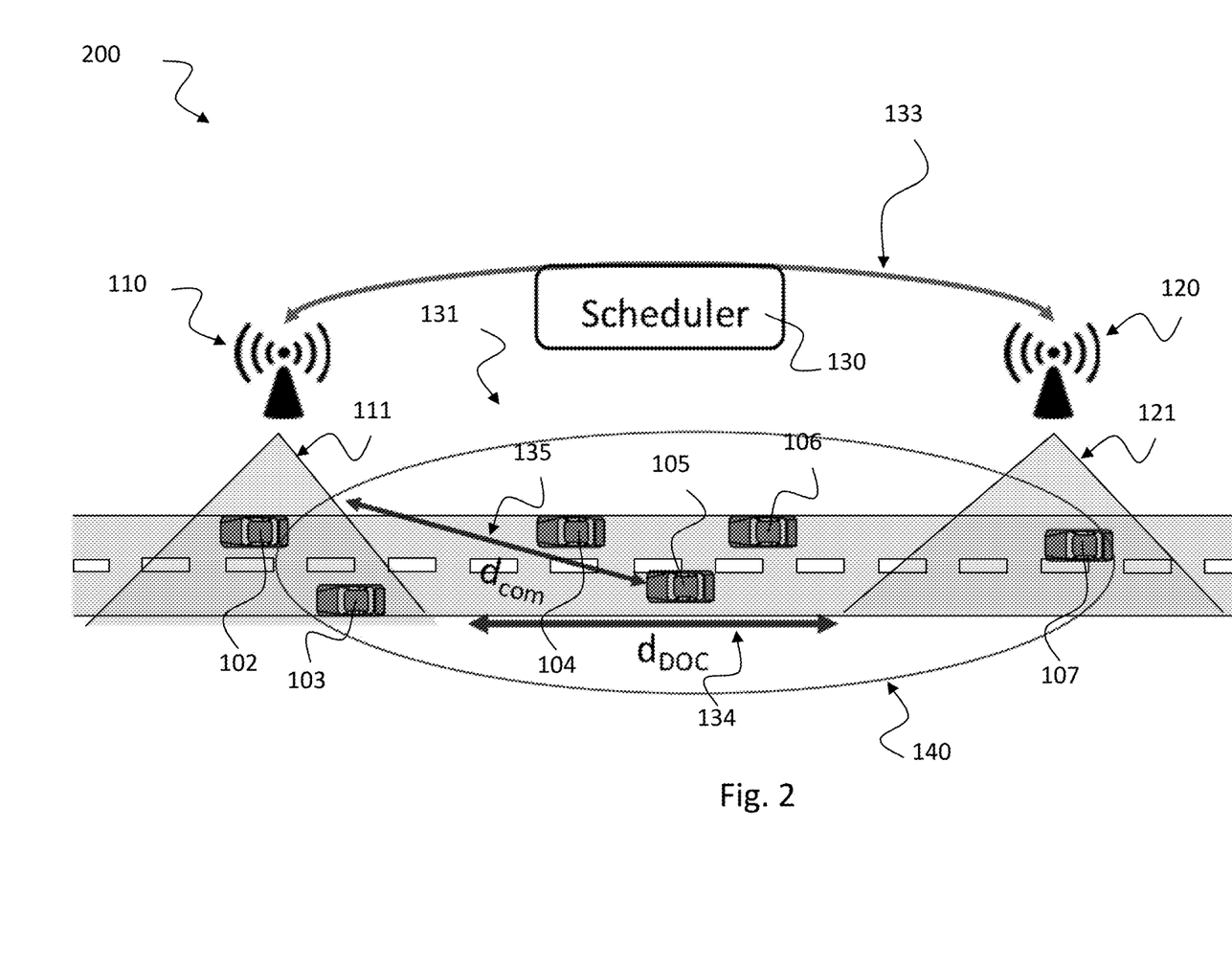
FIG. 2 shows a schematic diagram illustrating overlapping resources with respect to both in-coverage and DOC vehicles according to a Case I scenario.

FIG. 2 shows a schematic diagram illustrating overlapping resources with respect to both in-coverage vehicles 102, 103, 107 and DOC vehicles 104, 105, 106 according to a Case I scenario. In the scenario of FIG. 2, the first vehicle 101 shown in FIG. 1 has passed the coverage area 111 of the first BS 110, while second vehicle 102 and third vehicle 103 are within the coverage area 111 of first BS 110, vehicles 104, 105, 106 are within DOC area 131 and vehicle 107 in within the coverage area 121 of the second BS 120. $d_{DOC}$ 134 is the radius of the DOC area 131 and $d_{COM}$ 135 is the communication range, i.e. the radius of the communication area 140 which can be illustrated as a circle.

The scenario of FIG. 2 illustrates a first case (Case I) where DOC 131 is a Single Collision Domain that is characterized by the relation $d_{DOC}<=d_{com}$, i.e. the DOC size is smaller than the vehicle communication range. Note that in case of different Tx powers, this simple case mutates to Case II described below with respect to FIG. 4. In this scenario, admission control needs to reserve enough resources to ensure all ad hoc services can be served. Hence, the scheduling assignment is trivial. Each vehicle gets one out of N (orthogonal) resources (i.e., no resource reuse). Note that for areas at the edge of DOC 131 (e.g., tunnel exit/entry), the scheduler 130 has to assign non-overlapping resources with respect to both in-coverage and DOC vehicles.

Figure 3:
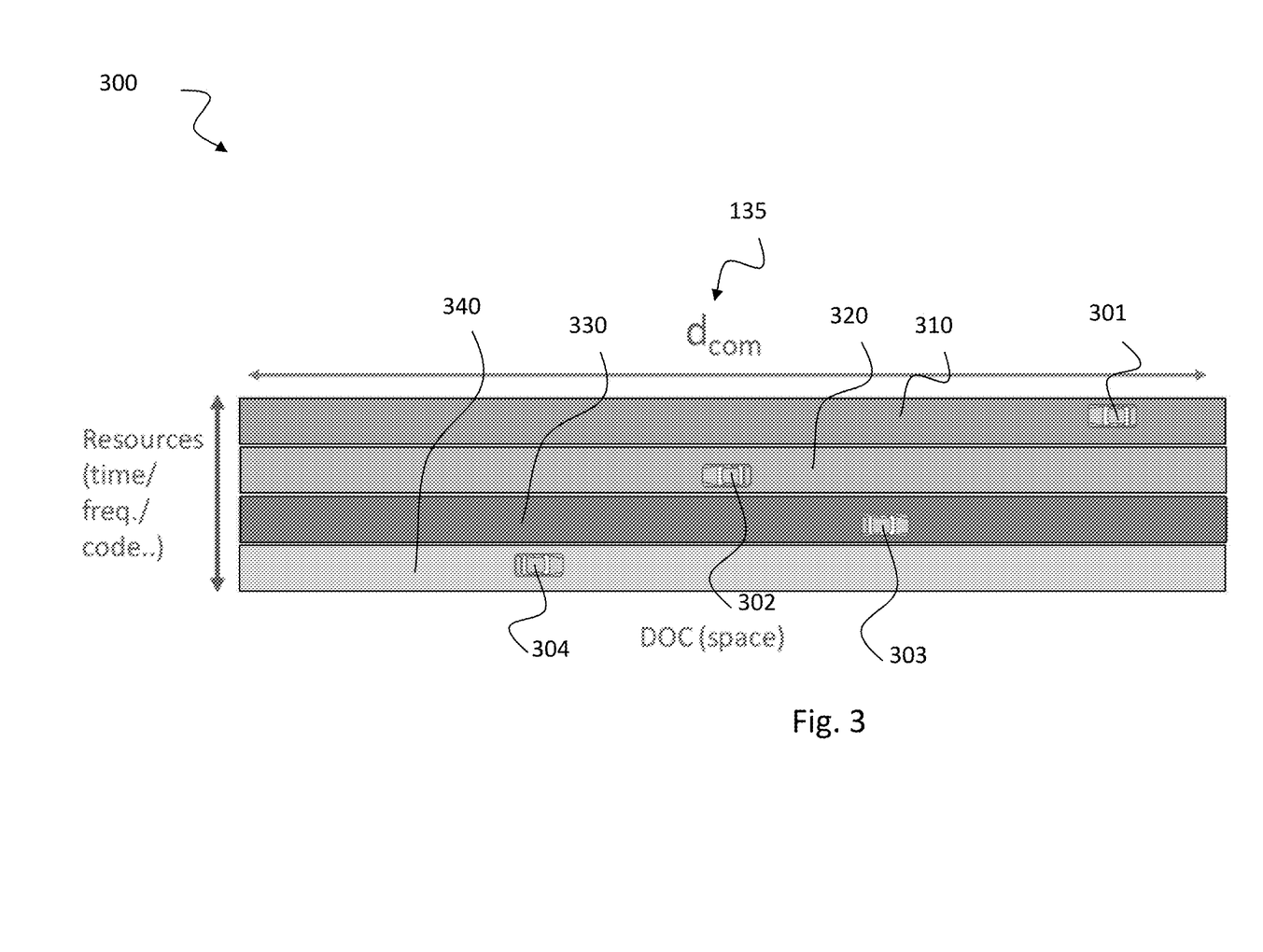
FIG. 3 shows a schematic diagram illustrating resource scheduling when a DOC area radius is less than a communication range according to a Case I scenario.

FIG. 3 shows a schematic diagram illustrating resource scheduling 300 when a DOC area radius is less than a communication range ($d_{DOC}<=d_{com}$) according to Case I described above. In this scenario, resources, e.g. in time, frequency and/or code are shared between the vehicles. For example a first resource 310 is allocated to a first vehicle 301, a second resource 320 is allocated to a second vehicle 302, a third resource 330 is allocated to a third vehicle 303 and a fourth resource 340 is allocated to a fourth vehicle 304. All vehicles are located at a different space of the DOC area 131.

The resource scheduling 300 may be configured to admit and/or schedule these non-overlapping radio resources 310, 320, 330, 340 which are non-overlapping in time and/or frequency and/or code for the mobile communication devices when a radius $d_{DOC}$ of the DOC area 131 is less than a communication range $d_{COM}$, 135 of the mobile communication devices. The resource scheduling 300 may be configured to schedule the non-overlapping radio resources 310, 320, 330, 340 for mobile communication devices within the area covered by the radio cell 110, 120 before entering the DOC area 131.

Figure 4:
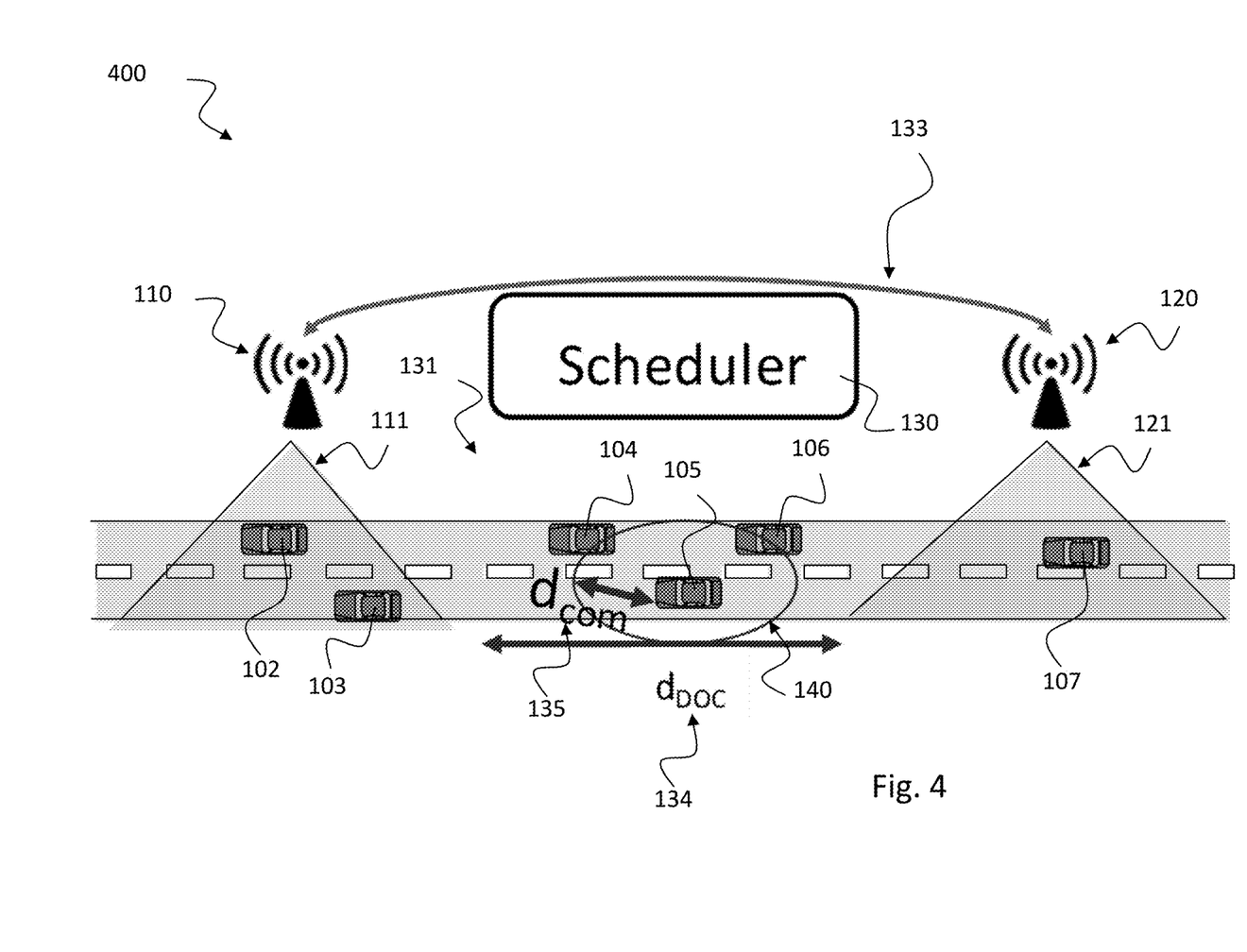
FIG. 4 shows a schematic diagram illustrating a mobile communication system 400 including a DOC area which is above a communication range according to a Case II scenario.

FIG. 4 shows a schematic diagram illustrating a mobile communication system 400 including a DOC area 131 which is above a communication range according to a Case II scenario. In this Case II scenario, the DOC area 131 is above a Collision Domain ($d_{DOC}>d_{com}$). This represents the complex case of $d_{DOC}>d_{com}$ (communication range). Admission control is similar to Case I described above with respect to FIG. 2. Scheduling assignment is non-trivial. Solving this problem can be done at least as good as N, but note that capacity of DOC>N. Hence, solving the problem can be done better than N by reusing resources within DOC. The scheduler can estimate vehicle speed and propagation condition and can identify "collision pairs", i.e. vehicles whose mobility and transmissions imply that they could collide if using same resource within DOC. The scheduler can calculate (tentative) an interference matrix between the vehicles. An exemplary resource scheduling for this Case II scenario is depicted in FIG. 5.

Figure 5:
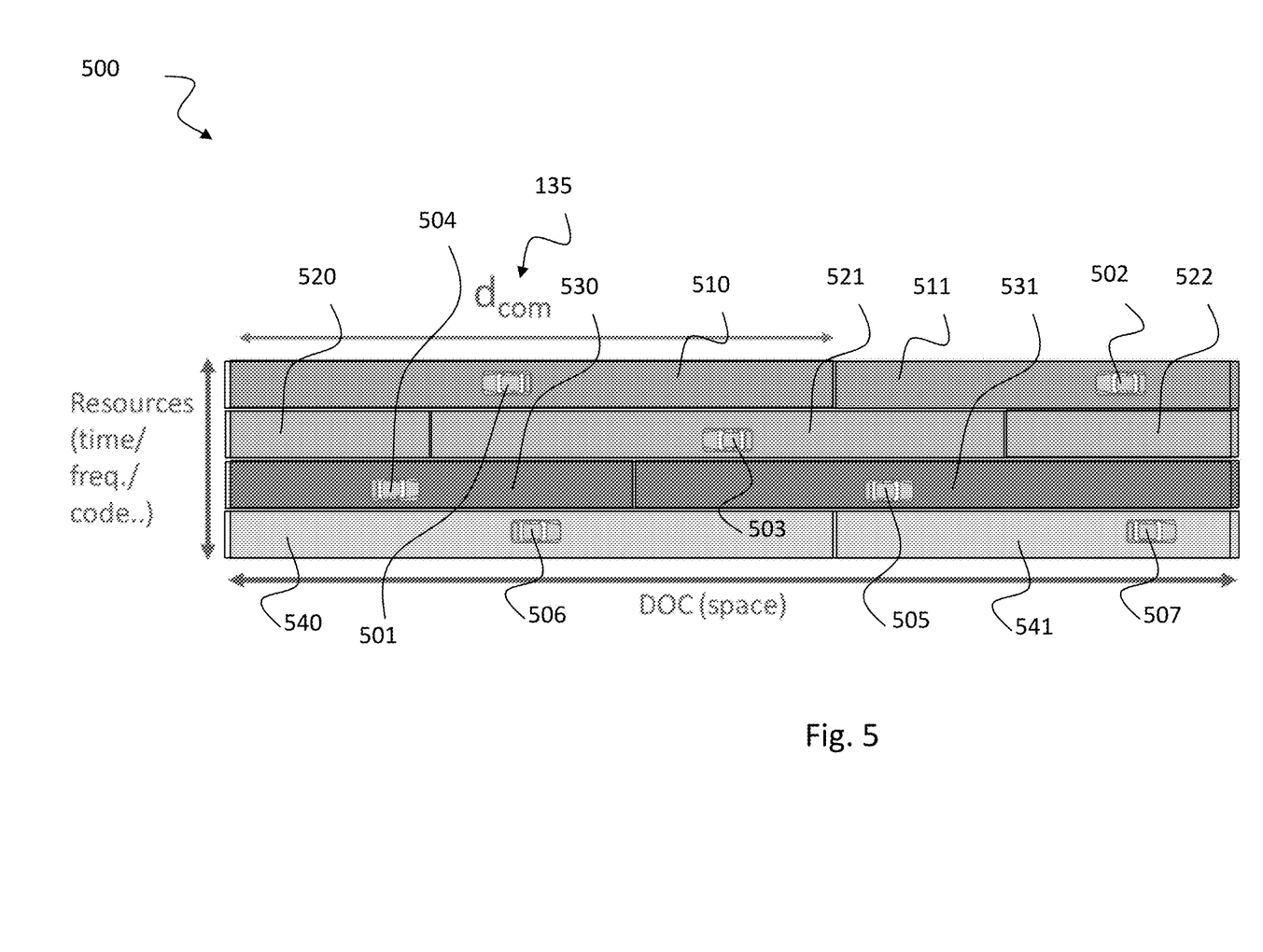
FIG. 5 shows a schematic diagram illustrating resource scheduling 500 when a DOC area radius above a communication range according to a Case II scenario.

FIG. 5 shows a schematic diagram illustrating an exemplary resource scheduling 500 when a DOC area radius is above a communication range according to a Case II scenario. In this Case II scenario, resources, e.g. in time, frequency and/or code are shared between the vehicles. For example a first resource 510 is allocated to a first vehicle 501, a second resource 511 is allocated to a second vehicle 502. A third resource 520 is free, a fourth resource 521 is allocated to a third vehicle 503 and a fifth resource 522 is free. A sixth resource 530 is allocated to a fourth vehicle 504 and a seventh resource 531 is allocated to a fifth vehicle 505. An eighth resource 540 is allocated to a sixth vehicle 506 and a ninth resource 541 is allocated to a seventh vehicle 507. Some vehicles may be located at a close distance within the DOC area 131. Each of the resources may be scheduled to a respective vehicle within the communication range $d_{COM}$, 135.

The resource scheduling 500 may be configured to schedule these overlapping radio resources 510, 511, 520, 521, 522, 530, 531, 540, 541 which may overlap in time and/or frequency and/or code, on spatially non-overlapping DOC areas when a radius $d_{DOC}$ of the DOC area 131 is above a communication range $d_{COM}$, 135 of the mobile communication devices.

Compared to Case I, there are several aspects that need to be taken into account, e.g.: 1) vehicles change speed (accelerate) when in DOC and 2) propagation conditions vary within DOC, both of which needs to be taken into account when scheduling resources. Also, note that this information is not available to scheduler a priori and needs to be estimated so that reliability (i.e., non-overlapping) is maintained.

Figure 6:
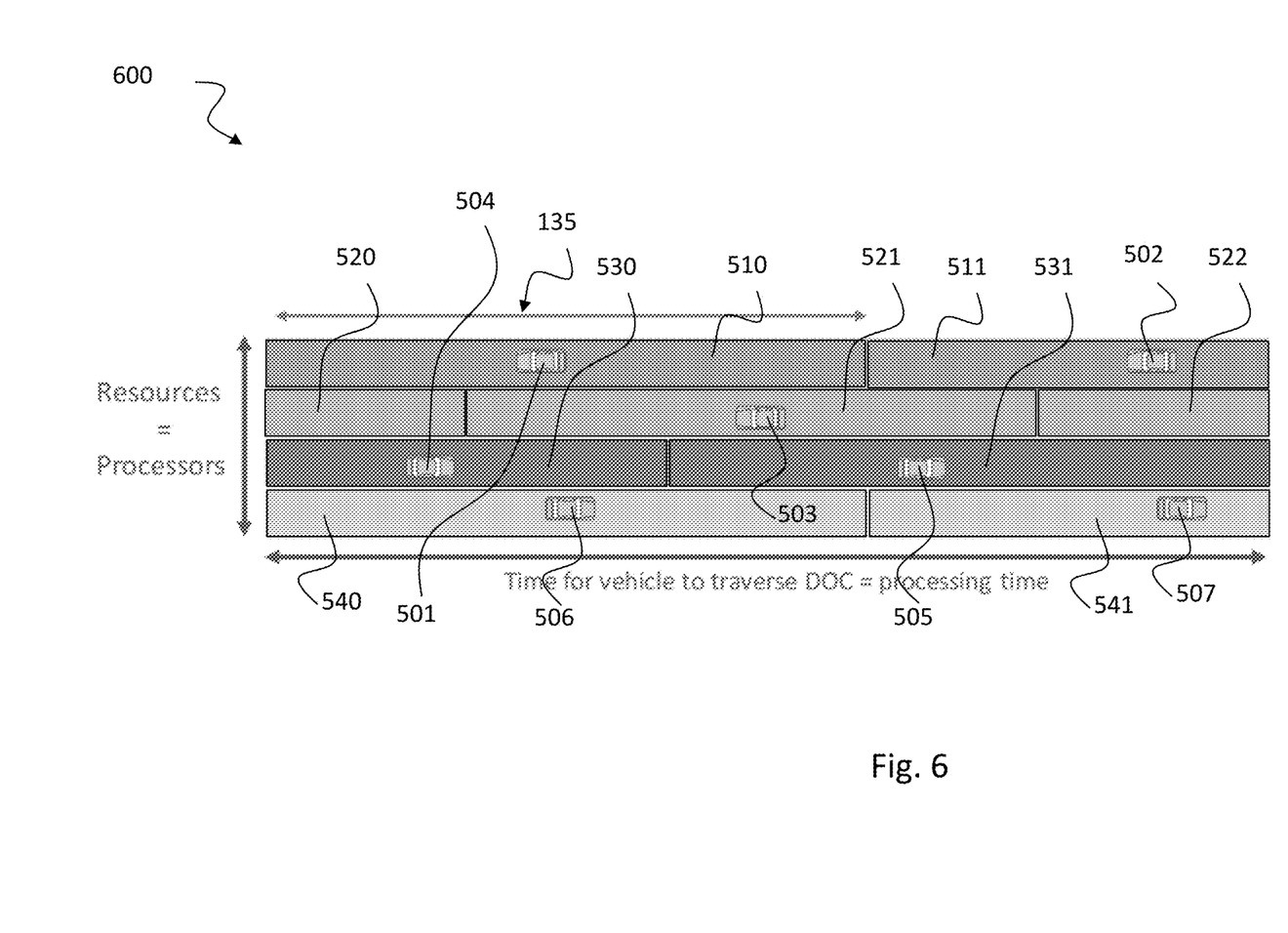
FIG. 6 shows a schematic diagram of an exemplary resource scheduling 600 when casted as a multi-processor scheduling problem according to a Case II scenario.

FIG. 6 shows a schematic diagram of an exemplary resource scheduling 600 when casted as a multi-processor scheduling problem according to a Case II scenario. Admission control may be the same as for the Case I scenario described above with respect to FIG. 2. Resource allocation, however, is not as simple as in the Case I scenario. The resource scheduling may correspond to the scheduling described above with respect to FIG. 5. However, in this scenario, resources correspond to processors and time for vehicle to traverse DOC corresponds to the processing time.

Resource allocation can be considered to be equivalent to an online bin packing problem. In the bin packing problem, objects of different volumes must be packed into a finite number of bins or containers each of volume V in a way that minimizes the number of bins used. In computational complexity theory, it is a combinatorial NP-hard problem according to "Korte, Bernhard; Vygen, Jens (2006). "*Bin-Packing*". *Combinatorial Optimization: Theory and Algorithms. Algorithms and Combinatorics* 21. Springer. pp. 426-441". The decision problem (deciding if a certain number of bins is optimal) is NP-complete according to "Barrington, David Mix (2006): "*Bin Packing*".

Alternatively, resource allocation can be considered to be equivalent to an online job shop scheduling. Job shop scheduling (or job-shop problem) is an optimization problem in computer science and operations research in which ideal jobs are assigned to resources at particular times. The most basic version is as follows: We are given n jobs $J_1$, $J_2, \ldots, J_n$ of varying processing times, which need to be scheduled on m machines with varying processing power, while trying to minimize the makespan. The makespan is the total length of the schedule (that is, when all the jobs have finished processing). In most practical settings, the problem is presented as an online problem (dynamic scheduling), that is, the decision of scheduling a job can only be made online, when the job is presented to the algorithm.

Alternatively, resource allocation can be considered to be equivalent to a Multi-Processor Scheduling (MPS), e.g. according to "Dertouzos, M. L. and Mok, A. K., 1989. Multiprocessor online scheduling of hard-real-time tasks. *IEEE transactions on software engineering*, 15(12), pp. 1497-1506". In computer science, multiprocessor scheduling is an NP-hard optimization problem. The problem statement is: "Given a set J of jobs where job $j_i$ has length and a number of processors m, what is the minimum possible time required to schedule all jobs in J on m processors such that none overlap?". The applications of this problem are numerous, but are, as suggested by the name of the problem, most strongly associated with the scheduling of computational tasks in a multiprocessor environment. The general multiprocessor scheduling problem is a generalization of the optimization version of the number partitioning problem, which considers the case of partitioning a set of numbers (jobs) into two equal sets (processors).

All of the above are NP-hard optimization problems. Due to specifics of the setting, the problem is best represented as Multi-Processor Scheduling (MPS) with hard real time task constraint. The scheduler can solve a version of MPS problem that maximizes number of tasks supported, given available resources/processors, where resources (time/frequency) correspond to processors, time for vehicle to traverse DOC corresponds to processing time and services/applications correspond to tasks. Hard real time constraint needs to be served while vehicle is within DOC, there is no flexibility. Note that the scheduler training can be performed using feedback from vehicles traversing DOC. Feedback used for training can comprise one or more of the following: Message error rates, Channel state information, Vehicle speed information (incl. average and distributions), Duration of traversal of DOC (individual and average).

Figure 7:
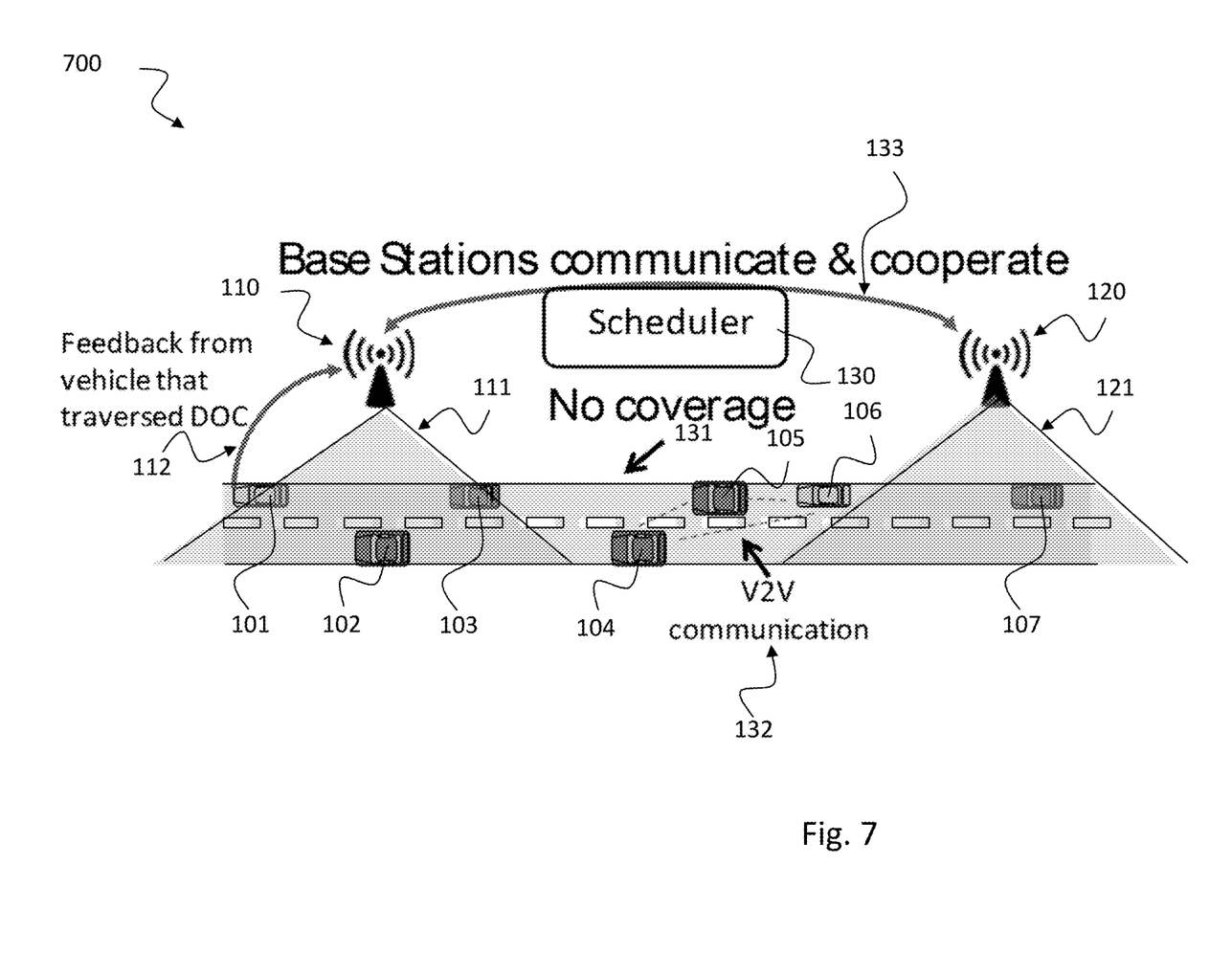
FIG. 7 shows a schematic diagram illustrating a mobile communication system 100 with an exemplary DOC area 131 in between two radio cells 110, 120 according to an implementation form.

FIG. 7 shows a schematic diagram illustrating a mobile communication system 100 with an exemplary DOC area 131 in between two radio cells 110, 120 according to an implementation form.

The preferred embodiment is according to FIG. 7. The base stations (BSs) 110, 120 will be located on the side of the road and surrounding the Delimited Out-of-Coverage (DOC) area 131 of the road. In one embodiment, DOC area 131 will be one-dimensional (e.g., highway), according to FIG. 6. In one embodiment, DOC area 131 will be two-dimensional, with two intersecting roads without coverage but delimited with a BS on each of the four exiting road ends. In one embodiment, the scheduler training can be performed using feedback 112 from vehicles 101 traversing DOC 131. In one embodiment, the infrastructure (BSs) 110, 120 and vehicles are implementing 3GPP standards for V2X communication, including: time and frequency resource division; operation in frequencies both between 700 MHz-6 GHz and in mmWave bands (10-100 GHz).

Figure 8:
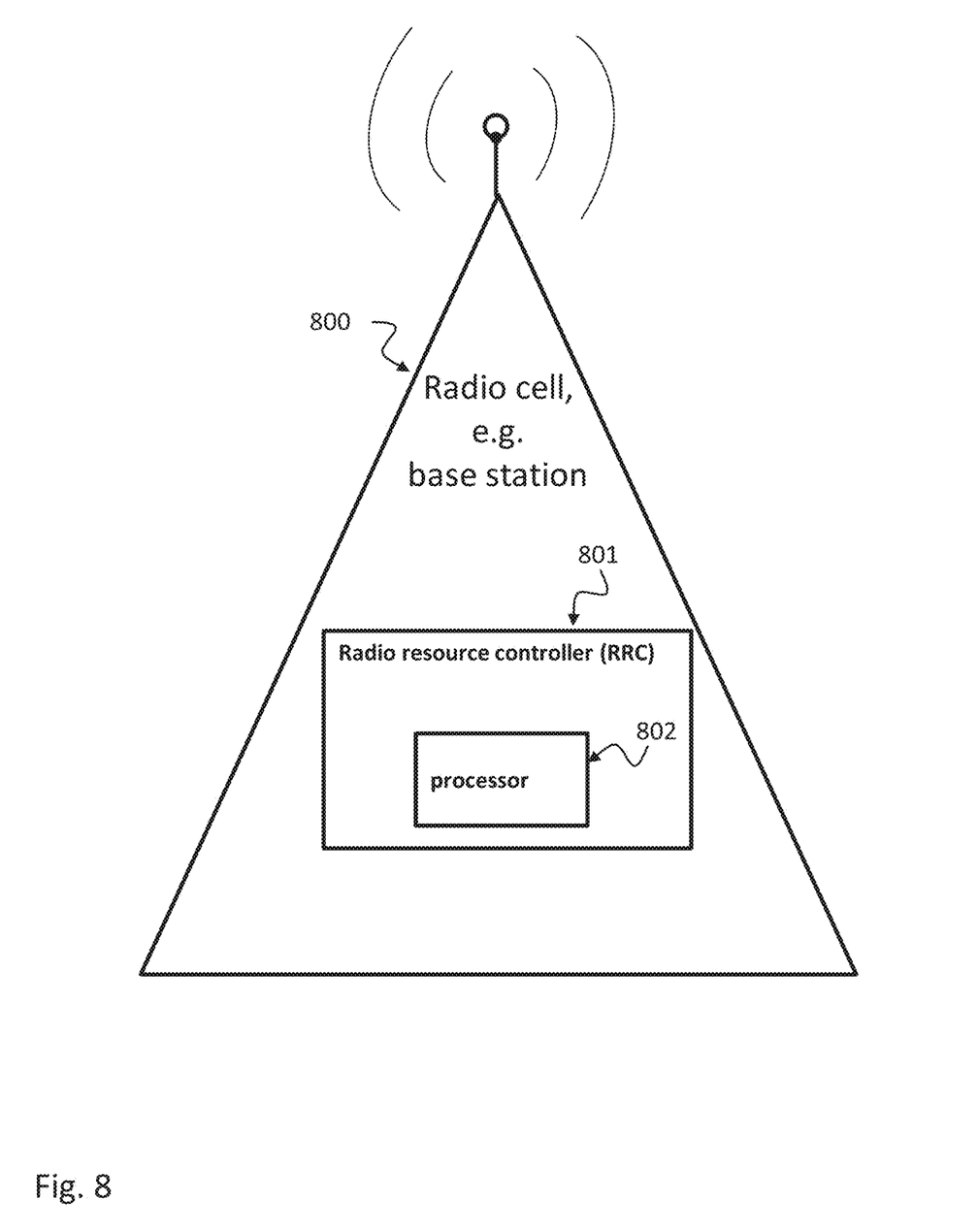
FIG. 8 shows a schematic diagram illustrating a radio cell 800 according to an implementation form.

FIG. 8 shows a schematic diagram illustrating a radio cell 800 according to an implementation form. The radio cell 800, e.g. a base station, includes a radio resource controller (RRC) 801 to preserve communication in an Out-of-Coverage (OOC) area, e.g. an OOC area 131 as shown above with respect to FIGS. 1 to 7. The radio cell 800 may be a base station 110, 120 as described above with respect to FIGS. 1 to 7. The RRC 801 includes a processor 802. The processor 802 is configured to determine an egress traffic of mobile communication devices, in particular vehicles 101, 102, 103, 104, 105, 106, 107, from an area 111, 121 covered by the radio cell 110, 120 to an OOC area 131 not covered by the radio cell 110, 120, e.g. as shown above with respect to FIGS. 1 to 7. The processor 802 is configured to determine an ingress traffic of mobile communication devices, in particular vehicles 101, 102, 103, 104, 105, 106, 107, from the OOC area 131 to the area 111 covered by the radio cell 110, 120, e.g. as shown above with respect to FIGS. 1 to 7. The processor 802 is configured to determine a demand of radio resources for services running on the mobile communication devices entering the OOC area 131. The processor 802 is configured to control admission to the services running on the mobile communication devices entering the OOC area 131, and schedule radio resources for the admitted services based on an admission and scheduling metric with respect to the egress traffic, the ingress traffic and the demand of radio resources.

The admission and scheduling metric may be based on at least one of the following: a target reliability, in particular a target error probability, vehicle 101, 102, 103, 104, 105, 106, 107 dynamics, in particular position, direction, speed and estimates thereof, transmit powers of the mobile communication devices entering the OOC area 131, a vehicle 101, 102, 103, 104, 105, 106, 107 density inside the OOC area 131, before the OOC area 131 and after the OOC area 131, a likelihood of Ad Hoc services. The admission and scheduling metric may be different for the Case I scenario described above with respect to FIGS. 2 and 3 and the Case II scenario described above with respect to FIGS. 4 to 6.

The services may comprise pre-scheduled services and Ad-hoc services. The processor 802 may be configured to reserve a portion of the schedulable radio resources for the Ad hoc services.

The processor 802 may be configured to admit and/or schedule the radio resources based on feedback 112 from mobile communication devices having traversed the OOC area 131, e.g. as described above with respect to FIGS. 1 to 7. The feedback 112 may comprises at least one of the following: message error rates, channel state information, vehicle 101, 102, 103, 104, 105, 106, 107 speed information, duration of traversal of the OOC area 131.

The OOC area 131 may comprises a delimited Out-of-Coverage (DOC) area, in particular a DOC area surrounded by radio cells 800, in particular base stations 110, 120 as described above with respect to FIGS. 1 to 7.

The processor 802 may be configured to admit and/or schedule non-overlapping radio resources, e.g. non-overlapping radio resources 310, 320, 330, 340 as shown in FIG. 3, in particular radio resources non-overlapping in time and/or frequency, for the mobile communication devices when a radius $d_{DOC}$, 134 of the DOC area 131 is less than a communication range $d_{COM}$, 135 of the mobile communication devices, e.g. as shown above with respect to FIGS. 1 to 7.

The processor 802 may be configured to schedule the non-overlapping radio resources 310, 320, 330, 340 for mobile communication devices within the area covered by the radio cell 110, 120 before entering the DOC area 131.

The processor 802 may be configured to schedule overlapping radio resources, e.g. overlapping radio resources 510, 511, 520, 521, 522, 530, 531, 540, 541 as shown in FIG. 5, in particular radio resources overlapping in time and/or frequency, on spatially non-overlapping DOC areas when a radius $d_{DOC}$, 134 of the DOC area 131 is above a communication range $d_{COM}$, 135 of the mobile communication devices.

The processor 802 may be configured to schedule the overlapping radio resources 510, 511, 520, 521, 522, 530, 531, 540, 541 based on reusing radio resources within the DOC area 131. The processor 802 may schedule the reusing of radio resources based on at least one of the following: a vehicle 101, 102, 103, 104, 105, 106, 107 speed estimation, a propagation condition estimation, a prediction of vehicle 101, 102, 103, 104, 105, 106, 107 meeting points within the DOC area 131.

The processor 802 may schedule the radio resources 510, 511, 520, 521, 522, 530, 531, 540, 541 for the mobile communication devices based on an estimated interference matrix indicating interference between the mobile communication devices.

The processor 802 may schedule the overlapping radio resources 510, 511, 520, 521, 522, 530, 531, 540, 541 for the mobile communication devices based on a multi-processor scheduling scheme, in particular by using feedback as described above with respect to FIGS. 1 to 7, wherein a number of schedulable radio resources corresponds to a number of processors of the multi-processor scheduling scheme, and wherein schedulable services running of the mobile communication devices correspond to schedulable tasks of the multi-processor scheduling scheme, e.g. as described above with respect to FIG. 6.

The processor 802 may schedule the radio resources 510, 511, 520, 521, 522, 530, 531, 540, 541 based on a set of pre-assigned radio resources.

Figure 9:
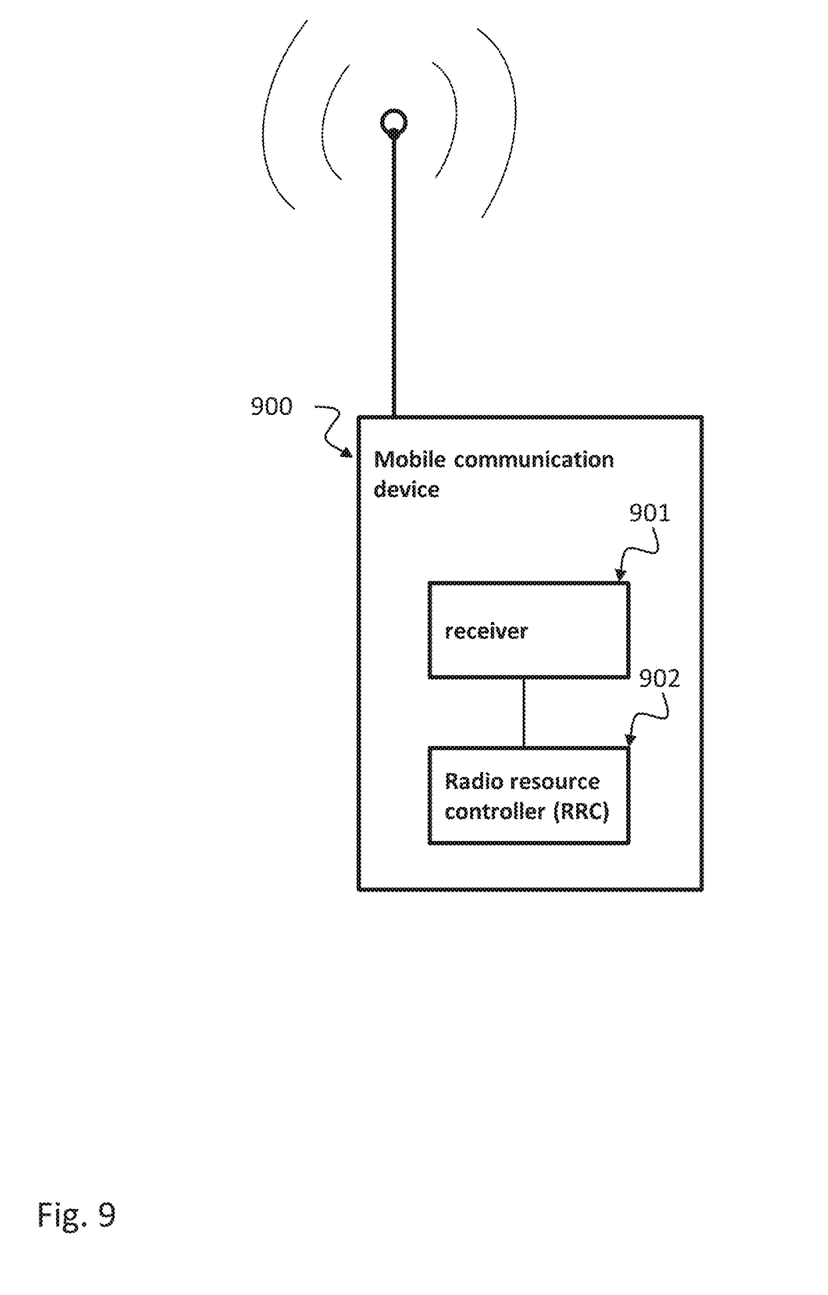
FIG. 9 shows a schematic diagram illustrating a mobile communication device 900 according to an implementation form.

FIG. 9 shows a schematic diagram illustrating a mobile communication device 900 according to an implementation form. The mobile communication device 900 includes a receiver 901 and a radio resource controller (RRC) 902.

The receiver 901 is configured to receive a radio resource control signal from a radio cell 800, in particular a base station 110, 120 as described above with respect to FIGS. 1 to 8, wherein the radio resource control signal indicates an admission to services running on the mobile communication device and a scheduling of radio resources for the admitted services when the mobile communication device enters an Out-of-Coverage (OOC) area 131 not covered by the radio cell 800, e.g. according to a Case I scenario or a Case II scenario described above with respect to FIGS. 2, 3 and 4 to 6.

The radio resource controller 902 is configured to admit the services and to schedule the radio resources for the admitted services based on the radio resource control signal received from the base station 110, 120 when the mobile communication device 900 enters the OOC area 131, e.g. as described above with respect to FIGS. 1 to 7.

The present disclosure also supports a method for preserving communication in an Out-of-Coverage (OOC) area, e.g. an OOC area 131 as shown above with respect to FIGS. 1 to 7. The radio cell 800 may be a base station 110, 120 as described above with respect to FIGS. 1 to 7. The method includes the following blocks: determining an egress traffic of mobile communication devices, in particular vehicles 101, 102, 103, 104, 105, 106, 107, from an area 111, 121 covered by the radio cell 110, 120 to an OOC area 131 not covered by the radio cell 110, 120, e.g. as shown above with respect to FIGS. 1 to 7. The method further includes determining an ingress traffic of mobile communication devices, in particular vehicles 101, 102, 103, 104, 105, 106, 107, from the OOC area 131 to the area 111 covered by the radio cell 110, 120, e.g. as shown above with respect to FIGS. 1 to 7. The method further includes determining a demand of radio resources for services running on the mobile communication devices entering the OOC area 131. The method further includes controlling admission to the services running on the mobile communication devices entering the OOC area 131, and scheduling radio resources for the admitted services based on an admission and scheduling metric with respect to the egress traffic, the ingress traffic and the demand of radio resources.

The present disclosure also supports a computer program product including computer executable code or computer executable instructions that, when executed, causes at least one computer to execute the performing and computing steps described herein, in particular the steps of the method described above. Such a computer program product may include a readable non-transitory storage medium storing program code thereon for use by a computer. The program code may perform the processing and computing steps described herein, in particular the method described above.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A radio resource controller (RRC) for use in a radio cell to preserve communication in an out-of-coverage (OOC) area not covered by the radio cell, the RRC comprising: a processor, configured to: determine an egress traffic of mobile communication devices from an area covered by the radio cell to the OOC area, determine an ingress traffic of mobile communication devices, from the OOC area to the area covered by the radio cell, determine a demand of radio resources for services running on mobile communication devices entering the OOC area, and control admission of the services running on the mobile communication devices entering the OOC area, and schedule radio resources for admitted services based on an admission and scheduling metric that takes into account the egress traffic, the ingress traffic, and the demand of radio resources, wherein the OOC area comprises a delimited out-of-coverage (DOC) area, and wherein the processor is configured to admit and schedule non-overlapping radio resources running on the mobile communication devices entering the OOC area in response to determining that a radius of the DOC area is less than a communication range of the mobile communication devices.

2. The RRC of claim 1, wherein the admission and scheduling metric is based on at least one of a target reliability, vehicle dynamics, transmit powers of the mobile communication devices entering the OOC area, a vehicle density inside the OOC area, before the OOC area, and after the OOC area, and a likelihood of ad-hoc services.

3. The RRC of claim 1, wherein the services comprise pre-scheduled services and ad-hoc services: and wherein the processor is configured to reserve a portion of the radio resources for the ad-hoc services.

4. The RRC of claim 1, wherein the processor is configured to admit the services running on the mobile communication devices entering the OOC area and schedule the admitted radio resources based on feedback from mobile communication devices that have previously traversed the OOC area.

5. The RRC of claim 4, wherein the feedback comprises at least one of the following: message error rates, channel state information, vehicle speed information, and duration of traversal of the OOC area.

6. The RRC of claim 1, wherein the processor is configured to schedule the non-overlapping radio resources running on the mobile communication devices entering the OOC area within the area covered by the radio cell before entering the DOC area.

7. The RRC of claim 1, wherein the processor is configured to schedule overlapping radio resources based on a set of pre-assigned radio resources.

8. The RRC of claim 1, wherein the egress traffic of mobile communication devices is an egress traffic of vehicles, and wherein the ingress traffic of mobile communication devices is an ingress traffic of vehicles.

9. The RRC of claim 2, wherein the vehicle dynamics include one or more of vehicle positions, vehicle directions, vehicle speeds, and estimates thereof.

10. The RRC of claim 1, wherein the DOC area is a DOC area surrounded by the radio cell and/or one or more additional radio cells.

11. The RRC of claim 1, wherein the non-overlapping radio resources are radio resources non-overlapping in one or both of time and frequency.

12. A radio resource controller (RRC) for use in a radio cell to preserve communication in an out-of-coverage (OOC) area not covered by the radio cell, the RRC comprising: a processor, configured to: determine an egress traffic of mobile communication devices from an area covered by the radio cell to the OOC area, determine an ingress traffic of mobile communication devices, from the OOC area to the area covered by the radio cell, determine a demand of radio resources for services running on mobile communication devices entering the OOC area, and control admission of the services running on the mobile communication devices entering the OOC area, and schedule radio resources for admitted services based on an admission and scheduling metric that takes into account the egress traffic, the ingress traffic, and the demand of radio resources, wherein the processor is configured to schedule overlapping radio resources on spatially non-overlapping DOC areas in response to determining that a radius of the DOC area is above a communication range of the mobile communication devices.

13. The RRC of claim 12, wherein the processor is configured to schedule the overlapping radio resources based on reusing radio resources within the DOC area.

14. The RRC of claim 13, wherein the processor is configured to schedule the reusing of radio resources based on at least one of the following: a vehicle speed estimation, a propagation condition estimation, a prediction of vehicle meeting points within the DOC area.

15. The RRC of claim 12, wherein the processor is configured to schedule the overlapping radio resources for the mobile communication devices entering the OOC area based on an estimated interference matrix indicating interference between the mobile communication devices entering the OOC area.

16. The RRC of claim 12, wherein the processor is configured to schedule the overlapping radio resources for the mobile communication devices entering the OOC area based on a multi-processor scheduling scheme, with or without using feedback, wherein a number of schedulable radio resources corresponds to a number of processors of the multi-processor scheduling scheme, and wherein schedulable services running on the mobile communication devices entering the OOC area correspond to schedulable tasks of the multi-processor scheduling scheme.

* * * * *